United States Patent
Mese et al.

(10) Patent No.: US 11,240,057 B2
(45) Date of Patent: Feb. 1, 2022

(54) ALTERNATIVE OUTPUT RESPONSE BASED ON CONTEXT

(71) Applicant: Lenovo (Singapore) Pte. Ltd., Singapore (SG)

(72) Inventors: John Carl Mese, Cary, NC (US); Russell Speight VanBlon, Raleigh, NC (US); Nathan J. Peterson, Oxford, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 272 days.

(21) Appl. No.: 15/922,346

(22) Filed: Mar. 15, 2018

(65) Prior Publication Data

US 2019/0288867 A1   Sep. 19, 2019

(51) Int. Cl.
*G10L 15/22* (2006.01)
*H04L 12/28* (2006.01)
*G06F 3/16* (2006.01)

(52) U.S. Cl.
CPC .......... *H04L 12/2823* (2013.01); *G06F 3/165* (2013.01); *G06F 3/167* (2013.01)

(58) Field of Classification Search
CPC .............. G10L 15/22; G10L 2015/223; H04L 12/2823; G06F 3/167
See application file for complete search history.

(56) References Cited

U.S. PATENT DOCUMENTS

| | | | |
|---|---|---|---|
| 6,463,428 B1* | 10/2002 | Lee | G06F 16/78 707/750 |
| 6,473,751 B1* | 10/2002 | Nikolovska | G06F 3/0482 |
| 6,662,177 B1* | 12/2003 | Martino | G06Q 10/02 |
| 9,257,120 B1* | 2/2016 | Alvarez Guevara | H04W 12/06 |
| 2003/0187848 A1* | 10/2003 | Ghukasyan | G06F 16/24547 |
| 2004/0172256 A1* | 9/2004 | Yokoi | G10L 15/22 704/275 |
| 2005/0165609 A1* | 7/2005 | Zuberec | G10L 15/22 704/270 |
| 2009/0018419 A1* | 1/2009 | Torch | G06F 3/013 600/318 |
| 2015/0120881 A1* | 4/2015 | Garcia Manchado | H04W 4/21 709/219 |
| 2015/0245095 A1* | 8/2015 | Gonzalez | H04N 21/4756 725/28 |
| 2015/0370531 A1* | 12/2015 | Faaborg | G06F 3/167 704/275 |
| 2016/0179807 A1* | 6/2016 | Kumar | G06F 16/24534 707/706 |

(Continued)

*Primary Examiner* — Michael N Opsasnick
(74) *Attorney, Agent, or Firm* — Ference & Associates LLC (57) ABSTRACT

One embodiment provides a method in which an audible command is first received from a user. Subsequent to receipt of the audible command, one or more sensors may detect certain contextual data associated with the user's physical surroundings. An embodiment may then determine, using the data, whether a default output response associated with the audible command is appropriate with respect to the user's physical surroundings. If the default output response is determined not to be appropriate, an embodiment may thereafter provide an alternative output response that is appropriate with respect to the user's surroundings. Other aspects are described and claimed.

19 Claims, 3 Drawing Sheets

(56) References Cited

U.S. PATENT DOCUMENTS

| | | | | |
|---|---|---|---|---|
| 2016/0217790 | A1* | 7/2016 | Sharifi | G10L 15/01 |
| 2016/0231812 | A1* | 8/2016 | Hansen | G06F 3/0482 |
| 2017/0024229 | A1* | 1/2017 | Chatterton | G06F 21/31 |
| 2017/0025124 | A1* | 1/2017 | Mixter | G10L 15/32 |
| 2017/0084275 | A1* | 3/2017 | Koetz | A47J 43/07 |
| 2017/0197617 | A1* | 7/2017 | Penilla | G08G 1/0112 |
| 2017/0213554 | A1* | 7/2017 | Faaborg | G06F 3/167 |
| 2018/0040322 | A1* | 2/2018 | Mixter | G10L 15/32 |

* cited by examiner

ALTERNATIVE OUTPUT RESPONSE BASED ON CONTEXT

BACKGROUND

Information handling devices ("devices"), for example smart phones, tablet devices, smart televisions, smart speakers, laptop and personal computers, and the like, may be capable of receiving command inputs from a user and thereafter performing one or more corresponding functions. One method of interacting with a device is to use digital assistant software employed on the device (e.g., Siri® for Apple®, Cortana® for Windows®, Alexa® for Amazon®, etc.). Digital assistants often provide some sort of notification output accompanying the performance of a function.

BRIEF SUMMARY

In summary, one aspect provides a method, comprising: receiving, at an information handling device, an audible command from a user; detecting, using one or more sensors, data associated with the user's surroundings; determining, using the data, whether a default output response associated with the audible command is appropriate with respect to the user's surroundings; and providing, responsive to determining that the default output response is not appropriate, an alternative output response that is appropriate with respect to the user's surroundings.

Another aspect provides an information handling device, comprising: one or more sensors; a processor; a memory device that stores instructions executable by the processor to: receive an audible command from a user; detect data associated the user's surroundings; determine, using the data, whether a default output response associated with the audible command is appropriate with respect to the user's surroundings; and provide, responsive to determining that the default output response is not appropriate, an alternative output response that is appropriate with respect to the user's surroundings.

A further aspect provides a product, comprising: a storage device that stores code, the code being executable by a processor and comprising: code that receives an audible command from a user; code that detects data associated with the user's surroundings; code that determines, using the data, whether a default output response associated with the audible command is appropriate with respect to the user's surroundings; and code that provides, responsive to determining that the default output response is not appropriate, an alternative output response that is appropriate with respect to the user's surroundings.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When using a digital assistant to control home automation processes (e.g., adjustment of light levels, adjustment of device sound levels, adjustment of temperature, etc.), the digital assistant generally provides some feedback or acknowledgement of the user command. For example, responsive to receiving a user command to perform a task, a device may provide the audible acknowledgement output "okay". As another example, subsequent to completing the user commanded task, a device may provide the audible completion output "task complete".

Conventionally, digital assistant output settings (e.g., volume of the output, wording of the output, etc.) are generally preconfigured settings set by a manufacturer or software programmer. Although this feedback mechanism provides an indication to the user that the digital assistant has received and/or processed their command, it can cause issues when an audible response is undesirable. For example, responsive to receiving a user command to turn off the lights in the bedroom, the provision of a loud and audible "okay" may cause a sleeping individual in the room to wake up. In another, similar example, after the lights in a room have been turned off responsive to a user command to do so, a digital assistant may provide the completion output "the lights are now turned off". Such an output may be redundant and/or unnecessary because a user may clearly see that the lights in a room have been turned off.

One existing solution may allow a user to interact with an application on an electronic control device (e.g., smart phone, tablet device, wall-mounted unit, etc.) to control a home automation setting. For example, a user may adjust the temperature in a room by providing touch input to a thermostat mounted on the wall or to a thermostat application on their tablet. However, in many situations a user may not have an electronic control device within reach and/or may find it inconvenient to move from their current position to retrieve the device or to walk over to a wall-mounted unit. Another solution may dynamically adjust an output volume of a device to mirror the input volume of a user command. For example, if a user provides an audible command in a whispered tone, the output may be provided at similar low-volume levels. However, a user may find it burdensome to continuously adjust their input volume so that corresponding output is provided at a contextually appropriate volume level.

Accordingly, an embodiment may contextually identify whether a default output response is appropriate with respect to a user's present surroundings and provide an alternative response if the default response is determined to be inappropriate. In an embodiment, an audible command from a user may be received at a device. An embodiment may thereafter determine, using detected data associated with a user's surroundings (e.g., ambient light and sound data, individual identity data, time-of-day data, device state data, etc.), whether a default output response corresponding to the audible command is appropriate with respect to the user's surroundings. Responsive to determining that the default output response is not appropriate, an embodiment may provide an alternative output response that is appropriate with respect to the user's surroundings. Such a method may provide audible feedback output at a contextually appropriate volume without requiring any additional actions or adjusted input techniques from a user.

The illustrated example embodiments will be best understood by reference to the figures. The following description is intended only by way of example, and simply illustrates certain example embodiments.

Figure 1:
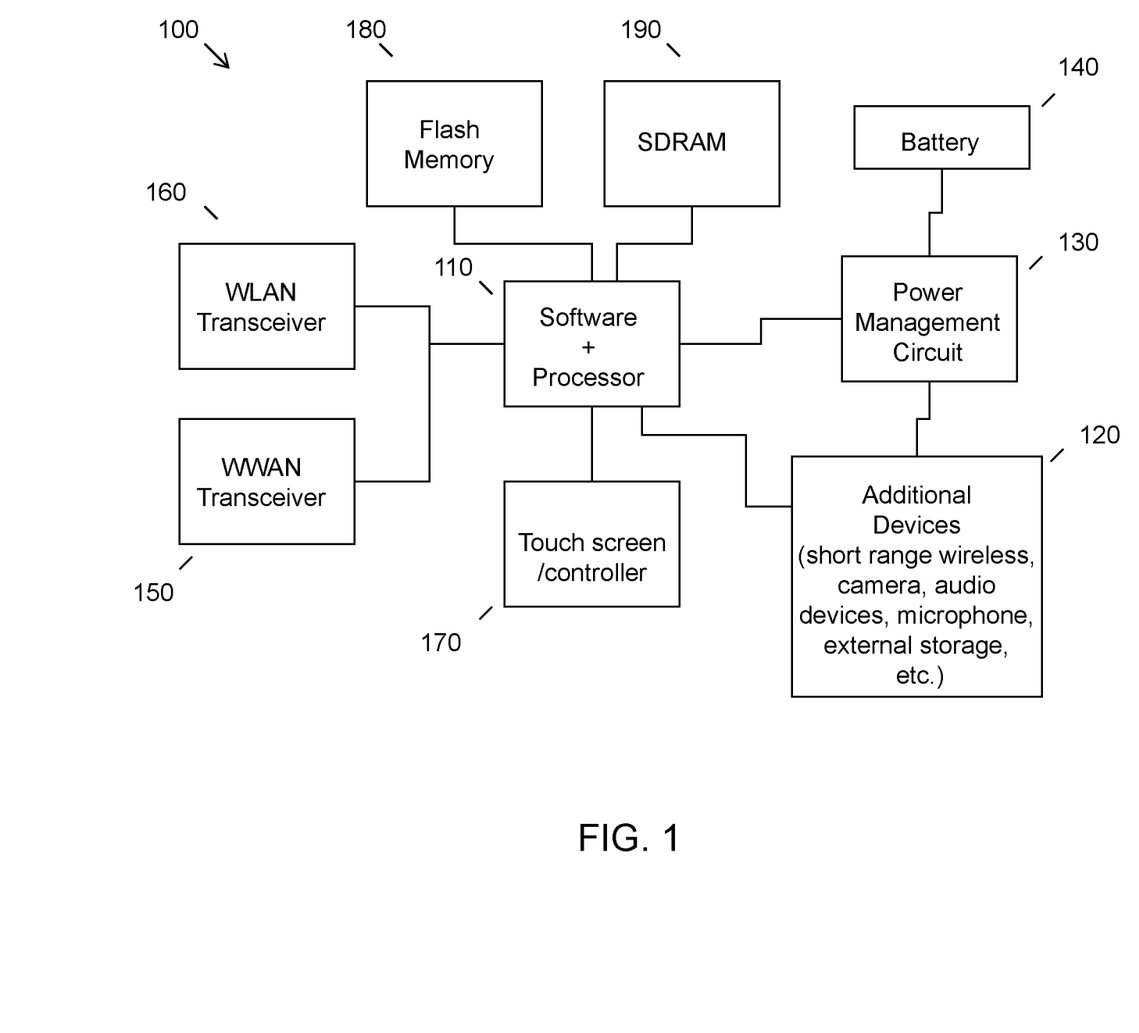
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
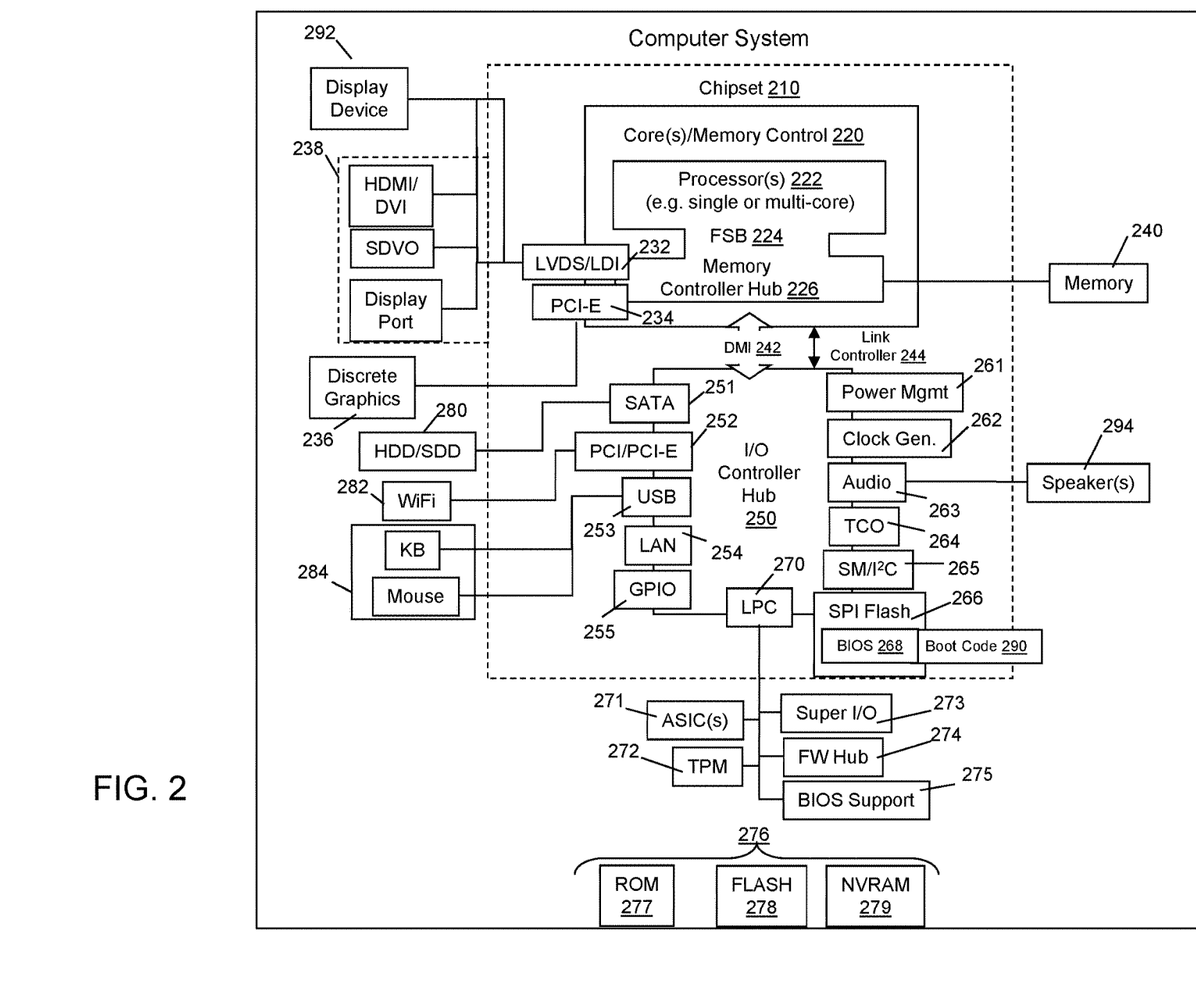
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
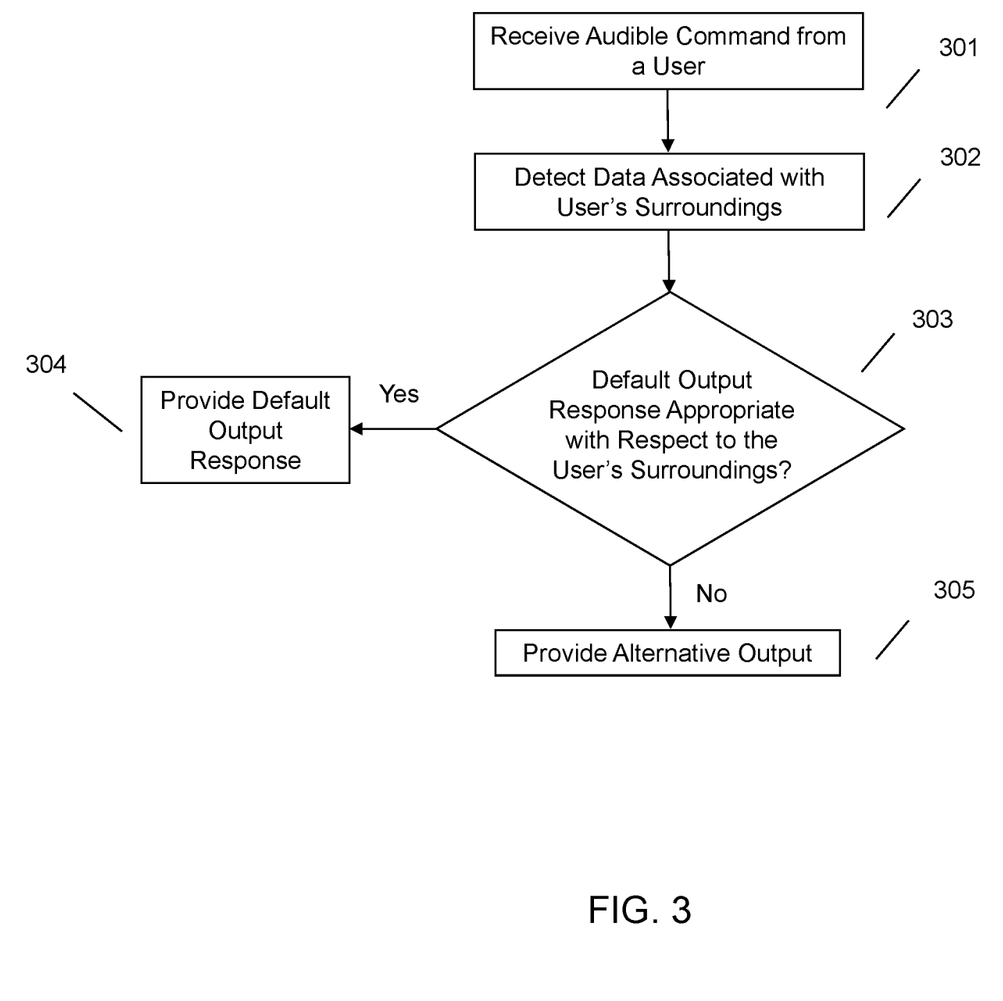
FIG. 3 illustrates an example method of providing an alternative output response.

Referring now to FIG. 3, an embodiment may provide an alternative output response at contextually appropriate output settings. At 301, an embodiment may receive an audible command from a user at a speech recognition device. The command may be virtually any command that demands performance of a corresponding function. In the context of this application, the command may be associated with performance of a home automation function (e.g., adjustment of light levels in a room, adjustment of device sound levels, adjustment of temperature, locking of doors, etc.). In an embodiment, the audible command may be received/detected by an input device (e.g., a microphone, an audio capture device, etc.) operatively coupled to or in communication with the speech recognition device. In an embodiment, the speech recognition device may be directly responsible for performance of the home automation function or, alternatively, may communicate the received command to another device for function execution. For simplicity purposes, the majority of the discussion herein will involve a speech recognition device that directly performs the home automation function, however, it should be understood that this is not limiting.

At 302, an embodiment may detect data associated with the user's surroundings. In an embodiment, the data may be context data and the context data may be virtually any kind of data associated with a user's surroundings such as ambient light data, ambient sound data, proximate individual data (i.e., the detection of other individuals in the user's proximate surroundings), proximate individual identity data (i.e., the detection of the identity of the other individuals in the user's proximate surroundings), time-of-day data, device state data (e.g., the power state of various devices in the user's proximate surroundings, etc.), device content data (e.g., the type of content being played on device's in the user's proximate surroundings, etc.), and historical data (e.g., prior preference data, etc.).

In an embodiment, the context data may be detected using one or more sensors. For example, light and sound sensors may be able to detect the ambient light and sound in a predetermined area (e.g., a room a user is in, etc.). In an embodiment, these sensors may also be able to detect the power state of other devices in the predetermined area (e.g., TV is on, radio is off, etc.). In an embodiment, an image capture device (e.g., static camera, video camera, etc.) may be able to capture images of the predetermined area. These images may then be analyzed to determine whether additional individuals are in the predetermined area and/or to determine the identity of those individuals. In an embodiment, user identification data received from devices associated with the additional individuals (e.g., wearable devices, smart phones, etc.) may also be used to determine the presence and/or identity of the additional individuals. In an embodiment, metadata may be received from active devices that identify the content being played on those devices (e.g., metadata may identify what is being currently broadcast on the TV, etc.). Although a plurality of examples for detecting context data have been provided, these examples are non-limiting and other types of context data not explicitly elaborated upon here may also be detected. Additionally, virtually any combination of these sensors may be utilized to detect context data.

In an embodiment, the one or more sensors may be integral to the speech recognition device. For example, a smart thermostat may be disposed with a camera capable of capturing images. Alternatively, the one or more sensors may be disposed on another device and may transmit context data to the speech recognition device. For example, ambient sound may be received at a smart speaker that may subsequently transmit the ambient sound data to another device (e.g., to a smart thermostat, etc.). Context data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the one or more sensors may be configured to continuously detect context data by maintaining the one or more sensors in an active state. Alternatively, in another embodiment, the one or more sensors may only begin to collect context data after receiving a user command to perform a function. In yet another embodiment, the one or more sensors may begin to collect context data after detecting that a user has entered a predetermined area. In this situation, the one or more sensors may remain in an active state for a predetermined amount of time (e.g., 30 minutes, 1 hour, 2 hours, etc.). Subsequent to not receiving any audible command input during this predetermined time window, an embodiment may switch one or more of the sensors to a power off state. The predetermined time window may be preconfigured by a manufacturer or, alternatively, may be configured and set by one or more users.

At 303, an embodiment may use the detected context data to determine whether a projected default output response associated with the audible command is appropriate with respect to the user's surroundings. In an embodiment, the default output response may be a confirmation response that the user's audible command was or was not received, a completion response that a function associated with the user's audible command was or was not completed, a combination thereof, and the like. In an embodiment, the default output response may be provided at predetermined output settings configured by a manufacturer. Alternatively, the default output response may be provided at the most recently adjusted output settings. In an embodiment, the determination may be conducted prior to actually providing the default output response. For example, an embodiment may identify the output settings (e.g., volume levels, location of the default output response, etc.) associated with a projected response prior to actually providing the response.

In an embodiment, the appropriateness of the default output response may be determined by comparing a projected audible level of the default output response to a stored list of appropriate output audible levels for different contextual situations. For example, an appropriate output audible level for a device at 2 am on a Tuesday morning may be much less than an appropriate output audible level for a device at 9 pm on a Friday night. As such, after an embodiment has gathered data associated with a user's surroundings, an embodiment may identify an appropriate audible level for output based on those surroundings (e.g., by accessing a stored list, etc.) and determine whether the output settings of a default output response are within or outside of the appropriate audible level for those surroundings.

Responsive to determining, at 303, that the default output response is appropriate with respect to the user's surroundings, an embodiment may, at 304, provide a default output response (i.e., an output response using default output settings). Conversely, responsive to determining that the default output response is not appropriate with respect to the user's surroundings, an embodiment may, at 305, provide an alternative output response (i.e., an output response using alternative settings than the default output settings.

In an embodiment, the alternative output response may be different than the default output response and may be appropriate with respect to the user's surroundings. In an embodiment, the alternative output response may be provided at a different volume setting (e.g., lower volume setting, a higher volume setting, etc.) than the default output response. For example, if an embodiment determines that the user is in an environment generally associated with no noise or quiet noise (e.g., a user is at work in their office, a user is at home late at night, etc.), an embodiment may provide output at lower output settings than the default output settings. Additionally and/or alternatively, using the aforementioned example, an embodiment may provide non-audible visual output, such as a visual notification (e.g., blinking lights, etc.) or textual message on a display screen of a user's device.

In an embodiment, the alternative output response may be provided using another device that is different than the speech recognition device. For example, if a user provides an audible command to a smart speaker to perform a function, a corresponding completion notification output may be provided to the user on their television screen. In an embodiment, a user's field of view may be determined (e.g., using gaze determination techniques, etc.) and the alternative output response may be provided on a detected device within the user's field of view. For example, if an embodiment determines that a non-audible visual response is appropriate based on the user's detected surroundings, an embodiment may identify that a user is currently looking at their television screen and thereafter provide the non-audible visual response on the television screen.

An embodiment may not provide any output response, default or alternative, responsive to determining that an output function corresponding to the audible command is apparent to the user. Such an embodiment may therefore eliminate, or reduce, redundant output. For example, a user may provide a command to turn off the lights in Room X. An embodiment may thereafter turn off the lights in Room X and determine whether the user is in Room X (e.g., using one or more user identification techniques, etc.). Responsive to determining that the user is in Room X, an embodiment not provide any output because the user would be naturally apprised that the system received and processed their command because the lights in the room likely would not have been turned off otherwise. In another, similar example, a user may provide a command to turn on their television, which is received and processed. An embodiment may determine a user's current gaze direction (e.g., using one or more gaze detection techniques, etc.) and identify whether the television is in the user's current field of view. Responsive to identifying that the television is in the user's current field of view, an embodiment may not provide any additional output.

The various embodiments described herein thus represent a technical improvement to conventional content output techniques. Using the techniques described herein, an embodiment may receive an audible command from a user and detect data associated with the user's surroundings. An embodiment may thereafter use the detected data to determine whether a default output response associated with the audible command is appropriate with respect to the user's surroundings. Responsive to determining that the default output response is not appropriate, an embodiment may provide an alternative output response that is appropriate. Such techniques may reduce or eliminate instances of obtrusive or interruptive output. Additionally, such techniques may reduce or eliminate instances of redundant and/or unnecessary feedback.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an audible command from a user to execute a home automation function;
   performing, responsive to receiving the audible command, the home automation function, wherein performance of the home automation function corresponds to a default output response from the information handling device, wherein the default output response comprises an audible output by the information handling device;
   determining, using one or more sensors, whether performance of the home automation function is apparent to the user, wherein the determining comprises:
     identifying, using the one or more sensors, a gaze location of the user; and
     determining whether the gaze location corresponds with an area in which the home automation function was performed; and
   providing, responsive to determining that performance of the function is not apparent to the user, an alert notification, wherein the alert notification comprises an alternative output response with respect to the default output response and wherein the alternative output response selected is based upon an environmental context of the user at the time of performance of the home automation function; and
   withholding, responsive to determining that performance of the function is apparent to the user, the alert notification.

2. The method of claim 1, wherein the alternative output response is provided at a different volume setting than the default output response.

3. The method of claim 1, wherein the providing comprises providing the alternative output response using another device different from the information handling device.

4. The method of claim 1, wherein the environmental context comprises at least one item of data selected from the group consisting of at least one of ambient light data, ambient sound data, time-of-day data, device state data, and device content data.

5. The method of claim 1, wherein selecting the alternative output response comprises comparing a sound level of the default output response to a stored list of appropriate output sound levels for the environmental context.

6. The method of claim 1, wherein the alternative output response is a non-audible visual response.

7. The method of claim 6, further comprising determining a user's field of view and wherein the providing comprises providing the alternative output response on a device within the user's field of view.

8. The method of claim 1, wherein the default output response and the alternative output response are associated with a command completion status.

9. The method of claim 8, wherein the audible command corresponds to performance of a function by another device different from the information handling device and wherein the command completion status is associated with the completion status of the function.

10. An information handling device, comprising:
    one or more sensors;
    a processor;
    a memory device that stores instructions executable by the processor to:
    receive an audible command from a user to execute a home automation function;
    perform, responsive to receiving the audible command, the home automation function, wherein performance of the home automation function corresponds to a default output response from the information handling device, wherein the default output response comprises an audible output by the information handling device;
    determine whether performance of the home automation function is apparent to the user, wherein the determining comprises:
      identify, using the one or more sensors, a gaze location of the user; and
      determine whether the gaze location corresponds with an area in which the home automation function was performed; and
    provide, responsive to determining that performance of the function is not apparent to the user, an alert notification, wherein the alert notification comprises an alternative output response with respect to the default output response and wherein the alternative output response selected is based upon an environmental context of the user at the time of performance of the home automation function; and
    withhold, responsive to determining that performance of the function is apparent to the user, the alert notification.

11. The information handling device of claim 10, wherein the alternative output response is provided at a different volume setting than the default output response.

12. The information handling device of claim 10, wherein the instructions executable by the processor to provide comprise instructions executable by the processor to provide the alternative output response using another device different from the information handling device.

13. The information handling device of claim 10, wherein the environmental context comprises at least one item of data selected from the group consisting of at least one of ambient light data, ambient sound data, time-of-day data, device state data, device content data.

14. The information handling device of claim 10, wherein selecting the alternative output response comprises comparing a sound level of the default output response to a stored list of appropriate output sound levels for the environmental context.

15. The information handling device of claim 10, wherein the alternative output response is a non-audible visual response.

16. The information handling device of claim 15, wherein the instructions are further executable by the processor to determine a user's field of view and wherein the instructions executable by the processor to provide comprise instructions executable by the processor to provide the alternative output response on a device within the user's field of view.

17. The information handling device of claim 10, wherein the default output response and the alternative output response are associated with a command completion status.

18. The information handling device of claim 17, wherein the audible command corresponds to performance of a function by another device different from the information handling device and wherein the command completion status is associated with the completion status of the function.

19. A product, comprising:
a non-transitory storage device having computer readable program code stored therewith, the computer readable program code comprising:
computer readable program code that receives an audible command from a user to execute a home automation function;
computer readable program code that performs, responsive to receiving the audible command, the home automation function, wherein performance of the home automation function corresponds to a default output response from the information handling device, wherein the default output response comprises an audible output by the information handling device;
computer readable program code that determines whether performance of the home automation function is apparent to the user, wherein the determining comprises:
identify, using the one or more sensors, a gaze location of the user; and
determine whether the gaze location corresponds with an area in which the home automation function was performed; and
computer readable program code that provides, responsive to determining performance of the function is not apparent to the user, an alert notification, wherein the alert notification comprises an alternative output response with respect to the default output response and wherein the alternative output response selected is based upon an environmental context of the user at the time of performance of the home automation function; and
computer readable program code that withholds, responsive to determining that performance of the function is apparent to the user, the alert.

* * * * *